United States Patent [19]

Pompei

[11] 4,456,456
[45] Jun. 26, 1984

[54] HOT-WATER HEATING SYSTEM HAVING AN AIR ELIMINATOR

[75] Inventor: Francesco Pompei, Wayland, Mass.

[73] Assignee: Amtrol Inc., West Warwick, R.I.

[21] Appl. No.: 430,280

[22] Filed: Sep. 30, 1982

[51] Int. Cl.³ .............................................. B01D 19/00
[52] U.S. Cl. ........................................ 55/203; 55/208; 237/63
[58] Field of Search ............. 55/39, 52, 159, 203–208; 122/406 R, 488, 489; 210/188; 237/59, 62, 63, 65

[56] References Cited

U.S. PATENT DOCUMENTS

| | | | |
|---|---|---|---|
| 1,734,507 | 11/1929 | Westling et al. | 55/52 |
| 1,737,680 | 12/1929 | Pinkham | 55/204 |
| 1,952,475 | 3/1934 | Tidd | 237/59 |
| 2,061,605 | 11/1936 | Yoder | 237/63 |
| 2,434,596 | 1/1948 | Spieth | 55/205 X |
| 2,578,568 | 12/1951 | Mayer et al. | 55/204 |
| 2,590,754 | 3/1952 | Cline | 55/204 |
| 2,710,664 | 6/1955 | Blackmore et al. | 237/63 X |
| 2,713,973 | 7/1955 | Hencken et al. | 237/63 |
| 2,735,622 | 2/1956 | Pintarelli | 237/63 |
| 2,762,451 | 9/1956 | McNeil | 55/204 |
| 2,790,606 | 4/1957 | Morgan et al. | 237/63 |
| 3,080,119 | 3/1963 | Shutkufski | 237/63 |
| 3,202,356 | 8/1965 | Gardner et al. | 237/65 X |
| 3,271,933 | 9/1966 | Harker et al. | 237/63 X |
| 3,276,187 | 10/1966 | Harker et al. | 237/63 X |
| 3,276,188 | 10/1966 | Carlson | 55/204 |
| 3,288,208 | 11/1966 | Blackmore et al. | 55/204 X |
| 3,290,864 | 12/1966 | Harker et al. | 237/63 X |
| 3,338,033 | 8/1967 | Ross | 55/39 X |
| 3,342,020 | 9/1967 | Ross | 55/39 X |
| 3,377,778 | 4/1968 | Gaertner | 55/52 |
| 3,812,655 | 5/1974 | Bennett | 55/204 |
| 3,912,468 | 10/1975 | Tsuchiya et al. | 55/159 |
| 3,992,172 | 11/1976 | Clark | 55/427 |
| 3,996,027 | 12/1976 | Schnell et al. | 55/36 |
| 4,053,291 | 10/1977 | Sims | 55/204 |
| 4,078,723 | 3/1978 | Hunt | 237/63 |
| 4,089,304 | 5/1978 | Beckmann | 55/208 X |
| 4,282,016 | 9/1981 | Tauber et al. | 55/204 |
| 4,299,248 | 11/1981 | Becker et al. | 137/202 |

FOREIGN PATENT DOCUMENTS

| | | | |
|---|---|---|---|
| 2316885 | 1/1973 | Fed. Rep. of Germany | 55/159 |
| 120745 | 7/1927 | Switzerland | 237/63 |
| 188822 | 4/1937 | Switzerland | 237/63 |

OTHER PUBLICATIONS

Thrush Amtrol, Inc., Technical Bulletin 8–80, Pressurization and Air Elimination System/Form HVAC 13–80, Amtrol, American Float Type Air Vents, Form No. RHP-12-110-1.

Amtrol, American Float Type Air Vents, Form No. RHP-12-110-1.

Amtrol Inc., Tangential Type Air Separator For Air Elimination.

Pompei, Francesco, "Air in Hydronic Systems: How Henry's Law Tells Us What Happens", ASHRAE Transactions 1981, vol. 87, Pt. 1, 16 pages.

American Air Purgers, Amtrol Inc., Form RHP-12-110-2.

Model No. 720, Air Eliminator, Thrush Amtrol Inc., Bulletin 720-1, Nov. 1979.

Primary Examiner—Robert H. Spitzer
Attorney, Agent, or Firm—Fisher, Christen & Sabol

[57] ABSTRACT

An improved forced-liquid flow, circulatory system for removing gas entrained or dissolved in the liquid. The system includes a circulatory liquid-flow network and means for forcing the liquid to flow through the circulatory network. A by-pass line is situated around the region where the lowest gas solubility in the liquid occurs in the circulatory network. Such lowest gas solubility occurs at the point of generally highest temperature and lowest pressure, as determined most precisely by Henry's Law. Gas-liquid separator means is located in the by-pass line. The separator means separates the gas from the liquid and expels the gas from the circulatory network.

9 Claims, 7 Drawing Figures

HOT-WATER HEATING SYSTEM HAVING AN AIR ELIMINATOR

BACKGROUND OF THE INVENTION

1. Field Of This Invention

This invention relates to a system for removing gas from a circulating liquid.

2. Prior Art

Numerous deaerating apparatus and systems are known for removing air from circulating water systems. For example, see the deaerating apparatus of U.S. Pat. No. 2,590,754 which uses a centrifugal gas and liquid separator to create a vortex in the liquid rotating in such separator. The separated air is removed from the deaerator via a vertical tube in the top of the deaerator. Such type of deaerating apparatus is known as the vortex-type of deaerating apparatus.

U.S. Pat. No. 3,276,188 shows a heating water-circulating system which has a loop formed of a boiler, a pump and a radiator, in that order in the water flow sequence. Vortex-type separating device 15 is located in the line between the outlet of the boiler and the inlet (suction side) of the pump. Air elimination of such separation is achieved by top line 16 and compression tank 17. U.S. Pat. No. 2,578,568 shows a heating water-circulating system which is similar in arrangement except that the pump is located after the boiler.

BROAD DESCRIPTION OF THE INVENTION

An object of this invention is to provide a forced-liquid flow, circulatory system which has improved means for removing gas from the liquid. Another object is to provide means for effectively separating a gas, such as, air, from a liquid, such as, water, at a much reduced cost than with prior art devices and methods. Other objects and advantages of this invention are set out herein or are obvious herefrom to one ordinarily skilled in the art.

The objects and advantages of this invention are achieved by the improved system of this invention.

This invention involves an improved forced-liquid flow, circulatory system for removing gas from the liquid. Normally a closed circulatory system is involved. The system includes a circulatory liquid-flow network and means for forcing the liquid to flow through the circulatory network. A by-pass line is preferably positioned around the region where the lowest gas solubility in the liquid occurs in the circulatory network. In a less preferred embodiment the by-pass line can be positioned around or in the region where a low liquid pressure (but not the lowest liquid pressure) occurs in the circulatory system. Gas-liquid separator means is located in the by-pass line. The separator means separates gas from the liquid, and continuously or intermittently expels the gas from the circulatory network. This invention provides considerable economical advantages and cost reductions over the prior art systems. Oxygen-caused corrosion in the water systems is virtually eliminated. A small air separator can be used in placed of the normally very large air separators.

The gas can be entrained or dissolved in the liquid and/or can be present in the liquid in the form of gas bubbles. In hot or chilled water systems the air, after the start up or fill up periods, is mostly present in the water in dissolved form.

The invention operates by taking full advantage of the physical process of air behavior in water (or other gas or liquid), as described by Henry's Law. This law can be expressed as:

$$X = P_T - P_V/H$$

where
- $P_T$ is the total pressure,
- $P_V$ is the vapor pressure,
- H is Henry's law constant, and
- X is the maximum quantity of gas held in solution.

The invention takes advantage of two important implications of this law. First, the point of lowest solubility, i.e., lowest X, is the optimum location for the air separating/eliminating device. Second, all other locations in the piping, by definition, have water with a higher X, i.e., the water will dissolve any additional air in the piping. The circulating water acts as a "sponge" to adsorb all air elsewhere in the piping and transport it, in solution, to the point of lowest solubility, where it is ultimately released from solution and vented.

Commonly, the point of lowest solubility, maximum X, is at the location of lowest pressure and highest temperature. The temperature effect is governed by the variation of $P_V$ and H, both of which vary with temperature such that, X is reduced with temperature increase. On a practical basis, however, the pressure effect is dominate.

The invention includes a closed piping system where the circulatory network is a cold or hot water piping system, the flow-forcing means is a pump, and the entrance and exit of said by-pass line at a space interval are communicatingly located before the inlet of the pump and after the outlet of the pump, respectively. This arrangement is applied when the lowest gas solubility occurs in the piping system, in this case, just before the pump inlet.

The invention also includes a closed hydronic system where the circulatory network is a cold or hot water pipe system, at least one radiator (or heat exchange device using water) is present in the circulatory network, water-heating means is present in the circulatory network before the radiator or radiators, and the flow-forcing means is a pump. The entrance and exit of the by-pass line at a spaced interval are communicatingly located before the inlet of the radiator and after the outlet of the radiator, respectively. This is the most preferred arrangement when the lowest solubility occurs at a radiator, for example, in a hot water system.

The circulatory system can be, for example, a hot water heating system or a cold water cooling system. The preferred air separator is of the vortex type.

The liquid used in the system of this invention is normally water, but can be other liquids such as polyethylene glycol. The gas in the liquid treated by the system of this invention is normally air, but can be other gases, such as, oxygen, nitrogen, methane, carbon dioxide and water vapor.

The improved system of this invention is efficient and effective in separating the gas from the circulating liquid, at minimum cost. Prior systems have employed full pipe size air separators as described in U.S. Pat. No. 3,276,188, and not necessarily at the correct location on the main line, i.e., the point of lowest solubility. Therefore, the improved system of utilizing a by-pass method, at the proper location, provides for both more effective gas removal and lower cost. For example, the fill piping size for fluid circulation at the pump might be 8 inches, requiring an 8 inch pipe size separator by earlier methods. With the subject invention a one inch pipe size separator will be sufficient and will provide improved air removal.

SHORT DESCRIPTION OF THE DRAWINGS

DETAILED DESCRIPTION OF THIS INVENTION

Figure 1:
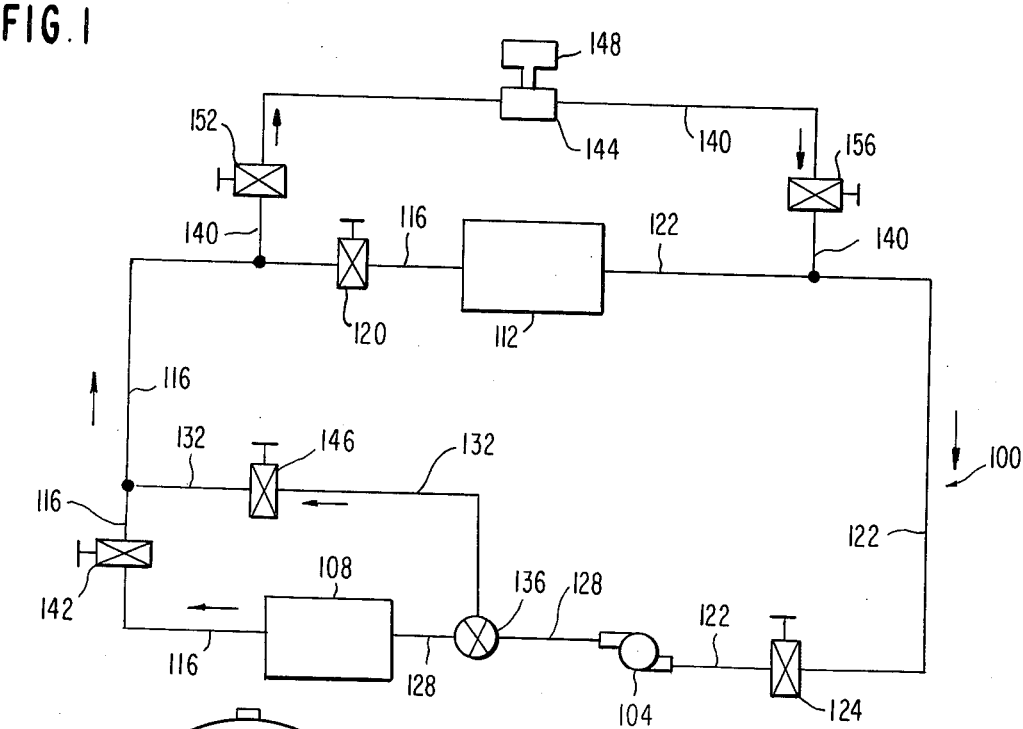
FIG. 1 is a schematic diagram of a preferred embodiment of the by-pass scheme of the invention.

In FIG. 1 hot-water heating system 100 includes pump 104, hot water heater 108 and radiator 112. Supply line 116 connects the outlet of hot water heater 108 with the inlet of radiator 112. Valve 120 is located in line (pipe) 116 just before radiator 112. Return line 122 connects the outlet of radiator 112 with the inlet of pump 104. Valve 124 is located in line (pipe) 122 just before pump 104. Line (pipe) 128 connects the outlet of pump 104 with hot water heater 108. By-pass line (pipe) 132 can be used to shunt all or part of the water around hot water heater 108 by means of two-way valve 136. Valve 146 is located in line 132 near line 116. Valve 142 is located in line 116 after hot water heater 108 but before the intersection with line 132.

Pump 104 can optionally be located in line 116 between boiler 108 and radiator 112, normally beyond the intersection of line 116 and by-pass line 132.

A low pressure region (i.e., low head) is normally present in system 100 in radiator 112 and the portions of pipes 116 and 122 near radiator 112. This is particularly so if the radiator is at a considerable height above hot water heater 108 (and pump 104). Such low pressure region may be the lowest pressure region in system 100 if radiator 104 is located one or more floors above hot water heater 108 (and pump 104). As shown in FIG. 1, by-pass line 140 is situated to by-pass radiator 112 (and valve 120) with its inlet connected to line 116 and its outlet connected to line 122. Air separator 144 is located in by-pass line 140. Air eliminator 148 is located on top of air separator 144. Valve 152 is located in line 140 before air separator 144. Valve 156 is located in line 140 after air separator 144.

Air-separator 144, to be most effective, should be located at a higher elevation than radiator 112. An advantage of the air-separator by-pass system around radiator 112 is that when flow through radiator 112 is shut off by means of valve 120, the flow can be continued through by-pass line 140 with the continued separation of air from the circulating water. By choosing a low pressure area for air separator 144, efficient and effective separation of any air from the circulating water is achieved. Air eliminator 148 continuously or intermittently eliminates the separated air. When flow is allowed through radiator 112, some of the water should also be allowed to flow through by-pass line 140 to maintain constant air separation and elimination. The by-pass should always operate at a low by-pass level.

Figure 2:
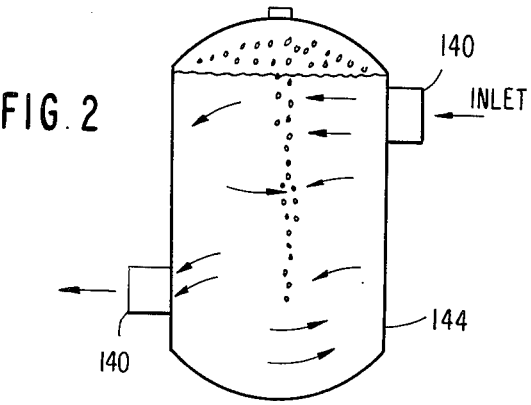
FIG. 2 is a side elevational view of an air separator.
Figure 3:
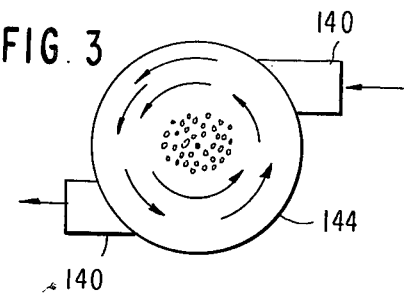
FIG. 3 is a top elevational view of the air separator of FIG. 2.

Air separator 144 is one in which air-bearing water is discharged under pressure (has a flow velocity) in a manner which causes the air-water mixture to move spirally within a receptacle of the separator to effect separation of the air from the water by centrifugal force and by buoyancy. The separated air exits out an opening in the top of air separator 144. The water exits out of the bottom (usually out an exit pipe located in the side near the bottom) of air separator 144. FIGS. 2 and 3 show a typical vortex-type of air separator 144, wherein the tangential inlet and outlet are shown, the arrows show the water flow (vortex formed) and the escaping air bubbles. Examples of such-type useful air separators (from water, etc.) are those disclosed in U.S. Pat. Nos. 2,590,754, 3,812,655 and 3,996,027, the pertinent portions of which are incorporated herein by reference thereto. Useful vortex-type air separators, which introduce the air-water mixture into the bottom region thereof, are those disclosed in U.S. Pat. Nos. 1,734,507, 2,578,568 and 3,276,188, the pertinent portions of which are incorporated herein by reference thereto. The air separator can be the air bubble separating device of U.S. Pat. No. 3,912,468, the pertinent portions of which are incorporated herein by reference thereto. Any other useful air separators can be used.

The air eliminator can be the diaphragm valve air vent device of U.S. Pat. No. 4,299,248 (Becker et al.), the pertinent portions of which are incorporated herein by reference thereto. Any other (continuous or intermittent) air eliminator can be used provided it can be used in conjunction with the air-water separator.

There can be more than one radiators 104 in heating system, but only one is shown in FIG. 1 for illustrative purposes.

Proper design of an air-free piping system includes two basic concepts:
 (a) Removal of the doment source of air by use of a diaphragm-type tank.
 (b) Providing a reliable air separation-elimination assembly at the right location to remove residual air.

The right location for the air separation-elimination assembly is preferably always at the "point of lowest solubility" of the air in the water. Only one assembly per system is necessary so long as it is at the proper location. More than one may be used if desired, for example, one per major piping zone. If there are many risers in a building, choose the riser which is most distant from the pump, since this is where pressure, and thus solubility, is the lowest.

An important point to keep in mind is that the water acts as a transporter of air in solution. If air bubbles exist somewhere other than at the "point of lowest solubility", then they will be absorbed by the water. Water which has released its air at the point of lowest solubility will absorb air everywhere else in the piping, since by definition, it has a higher solubility everywhere else. The air thus absorbed is carried in solution to the air elimination point where it is removed from the system.

The point of lowest solubility is the point of highest temperature and lowest pressure. Since the temperature usually has a lesser effect than pressure, the question is simply reduced to finding the point where pressure is lowest. The choice reduces to two: system top or system bottom at pump suction.

Since the pump effect at the top point (highest elevation) of the system is usually about one half of its head, then it follows that the pressure at the top will be lower than the pressure at the bottom if one half of the pump head is less than the elevation of the high point. This requirement can be summarized as follows:

(a) If the pump head is greater than twice the maximum elevation, then the air separation-elimination system is located at the bottom.

(b) If the pump head is less than twice the maximum elevation, then the air separation-elimination system is located at the top.

Figure 4:
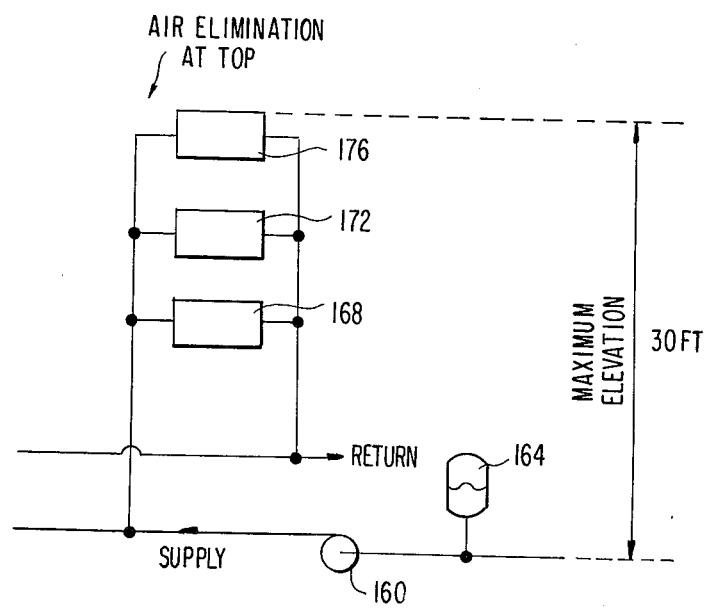
FIG. 4 is a schematic view of the system to locate the by-pass scheme.

FIG. 4 illustrates the above method. In FIG. 4, pump 160, diaphragm-type tank 164, and radiators 168, 172 and 176 are shown. The hot water heater is not shown. For purposes of illustration, the pump has a 300 gpm capacity at a 40 foot head and the maximum elevation to top radiator 176 is 30 feet. If the pump head is greater than twice the maximum elevation, then the air separator-eliminator is located at the bottom of the system. If the pump head is less than twice the elevation, then the air separator-eliminator is located at the top of the system. In the illustration, the forty foot head is less than twice the 30 foot maximum elevation, so the air separation-elimination should be located at the top (i.e. on a by-pass around top radiator 176). This illustrates how to decide between a top location and a bottom location for the air separation-elimination assembly.

Figure 5:
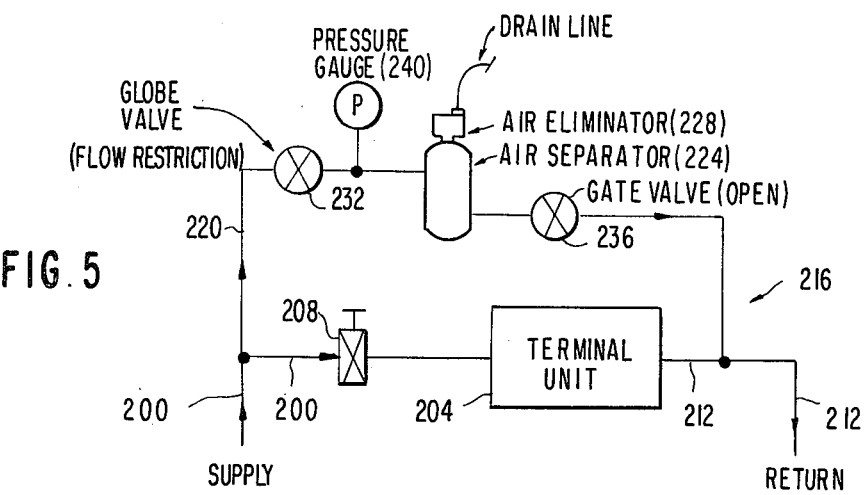
FIG. 5 is a schematic view of the by-pass scheme for a radiator.

It takes very little time (less than an hour) to get most of the air out of a hot-water heating system (closed). The top arrangement of FIG. 5 provides continuous flow at low rate. The continuous flow is important to insure an air free system. Whenever the pump(s) operate, the water circulating through the piping will scavenge any air having been admitted in the piping, and carry it to the assembly of FIG. 5. Here the air is released from solution and vented from the system.

In FIG. 5 the pump and hot-water heater are not shown. Supply line 200 connects the outlet of the hot water heater with the inlet of radiator 204. Valve 208 is located in line (pipe) 200 just before (or just after) radiator 204. Valve 208 is commonly of the automatic type which modulate the flow through the radiator (heat exchanger) in response to space conditioning requirements. Return line 212 connects the outlet of radiator 204 with the inlet of the pump. A low pressure region is normally present in system 216 in radiator 204 and the portions of pipes 200 and 212 near radiator 204. This is particularly so if radiator 204 is at a considerable height above the hot water heater and pump. Such low pressure region may be the lowest pressure region in the piping system if radiator 204 is located one or more floors above the pump.

As shown in FIG. 5 by-pass line 220 is situated to by-pass radiator 204 (and valve 208) with its inlet connected to supply line 200 and its outlet connected to return line 212. Air separator 224 is located in by-pass line 220 and is of the vortex-type. Air eliminator 228 is located on top of air separator 224. Valve 232 is located in line 220 before air separator 224. Valve 236 is located in line 220 after air separator 224. Pressure gauge 240 is located in line 220 between valve 236 and air separator 224.

Valve 236 upstream of separator 224 is partially closed such that the separator (224) pressure is close to the return line (212) pressure. Also, this arrangement insures continuous flow even if there is a control valve in the terminal line, such as, valve 208. The flow rate required is low—it acts as a bleed by-pass, but is sufficient to deaerate the system. The valves, in addition to acting as restrictions, are necessary for isolation in the event that servicing is required.

Figure 6:
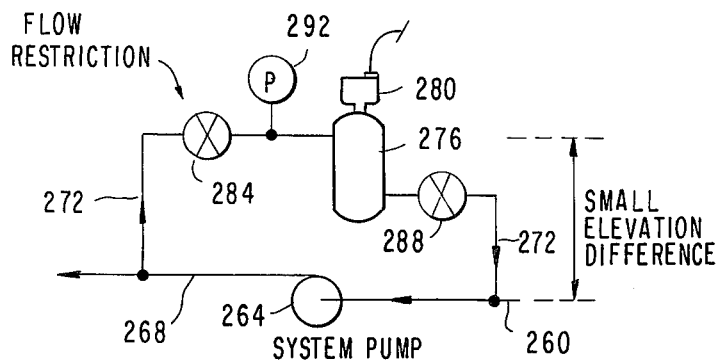
FIG. 6 is a schematic view of the by-pass scheme for a pump.

FIG. 6 shows a similar arrangement for an assembly at the system bottom, i.e., at the pump. The hot-water heater and radiator are not shown. Return line 260 is connected to the inlet of pump 264. Line 268 is connected to the outlet of pump 264. By-pass line 272 is situated to by-pass pump 264. Air separator 276 is located in by-pass line 272 and is of the vortex-type. Air eliminator 280 is located on top of air separator 276. Valve 284 is located in line 272 before air separator 276. Valve 288 is located in line 272 after air separator 276. Pressure gauge 292 is located in line 272 between valve 284 and air separator 276. Using the bleed by-pass approach, air separator 276 can be a very small one, even though the line size may be very large. With upstream valve 284 throttled, the separator pressure is close to the pump suction pressure. Note that there is considerable cost reduction since a small separator replaces a normally huge one of full line size.

A basic reason that this by-pass approach works is that one is only handling residual air, which is possible only if a diaphragm expansion tank is used.

With non-diaphragm type compression tanks, huge quantities of air can be generated by the saturated water in the tank, and if not immediately separated can lodge in the piping at higher elevations. With diaphragm-type tanks, only a residual amount will exist, and this will be transported by the water to the appropriate location.

Figure 7:
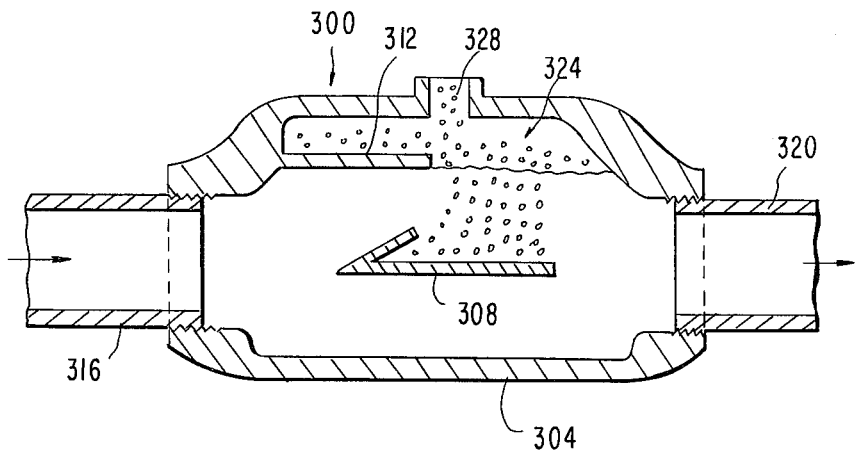
FIG. 7 is a side elevational view of another air separator.

The most effective air separator is a tangential air separator, such as, those manufactured by Amtrol Inc., Thrush Division (model series AS and AS-L), which utilize a vortex air pattern to create a core of lighter air bubbles and water. The reduced velocity allows the air to rise to the top to be vented. In-line air separators can be used when available space is a problem, but are less effective as they allow substantial amounts of air to escape back into the water system. Figure 7 shows an air purger 300 (such as Amtrol Inc., air purgers model, e.g., series 443 to 448). Air purger 300 has casing 304, central baffle (diverter) 308 and water-level plate 312. Water flows in via inlet pipe 316 and exits via outlet pipe 320. Central horizontal baffle causes air bubbles to form which escape above the water level into air chamber 324. The air exits via passageway 328. Air purger 300 is less effective than the above types of air separators.

The preferred air eliminator is Model 720 Air Eliminator made by Amtrol Inc.

Dissolved oxygen combines with metallic surfaces to form oxides, which is a disadvantage of dissolved air in water. Air binding of terminal units and the accumulation of air bubbles in pipes causes noise and inefficient operation. Air cavitation causes the loss of pump efficiency. This invention greatly eliminates or alleviates such problems. Furthermore, this invention essentially eliminates corrosion caused by oxygen in the system which is a tremendous economic advantage over prior systems. This invention has several advantages over prior systems which provide quite significant economic advantages and savings.

What is claimed is:

1. An improved forced-liquid, closed, flow circulatory system comprising a closed circulatory liquid-flow network, means for forcing said liquid to flow through said closed circulatory network, a by-pass line around the region where the lowest gas solubility in the liquid occurs in said closed circulatory network, and gas-liquid separator means located in said by-pass line, whereby said separator means separates gas from said liquid and expels said gas from said closed circulatory network.

2. The improved system as claimed in claim 1 wherein said liquid is water, said closed circulatory network is a closed hot water pipe system, said flow-forcing means is a pump, and the entrance and exit of said by-pass line at a space interval are communicatingly located before the inlet of said pump and after the outlet of said pump, respectively, the region where the lowest gas solubility occurs in said closed pipe system being between said pump inlet and said entrance of said by-pass line.

3. The improved system as claimed in claim 1 wherein said liquid is water, said closed circulatory network is a closed hot water pipe system, at least one heat exchanger device is present in said closed circulatory network, water-heating means is present in said closed circulatory network before said at least one heat exchanger device, said flow-forcing means is a pump, and the entrance and exit of said by-pass line at a spaced interval are communicatingly located before the inlet of said heat exchanger device of said at least one heat exchanger device, where the lowest gas solubility occurs in said closed pipe system, and after the outlet of said heat exchanger device, respectively.

4. The improved system as claimed in claim 3 wherein water-heating means is a hot-water heater.

5. The improved system as claimed in claim 1 wherein the gas-liquid separator is a vortex-type of gas-liquid separator.

6. The improved system as claimed in claim 1 wherein said liquid is water, said closed circulatory network is a closed chilled water pipe system, said flow-forcing means is a pump, and the entrance and exit of said by-pass line at a space interval are communicatingly located before the inlet of said pump and after the outlet of said pump, respectively, the region where the lowest gas solubility occurs in said closed pipe system being between said pump inlet and said entrance of said by-pass line.

7. The improved system as claimed in claim 1 wherein said liquid is water, said closed circulatory network is a closed chilled water pipe system, at least one heat exchanger device is present in said closed circulatory network, water-heating means is present in said closed circulatory network before said at least one heat exchanger device, said flow-forcing means is a pump, and the entrance and exit of said by-pass line at a spaced interval are communicatingly located before the inlet of said heat exchanger device of said at least one heat exchanger device, where the lowest gas solubility occurs in said closed pipe system, and after the outlet of said heat exchanger device, respectively.

8. The improved system as claimed in claim 1 wherein the temperature of the liquid in the closed circulatory system changes and therefore the closed circulating system has a pressure control device.

9. The improved system as claimed in claim 8 wherein the pressure control device is a diaphragm-type expansion tank.

* * * * *